(12) United States Patent
Hösker

(10) Patent No.: US 9,493,202 B2
(45) Date of Patent: Nov. 15, 2016

(54) OVERHEAD CONVEYING DEVICE HAVING A SELF-SUPPORTING SUPPORTING FRAMEWORK

(71) Applicant: Torsten Hösker, Osterburken (DE)

(72) Inventor: Torsten Hösker, Osterburken (DE)

(*) Notice: Subject to any disclaimer, the term of this patent is extended or adjusted under 35 U.S.C. 154(b) by 0 days.

(21) Appl. No.: 14/420,103

(22) PCT Filed: Jul. 24, 2013

(86) PCT No.: PCT/DE2013/000407
§ 371 (c)(1),
(2) Date: Feb. 6, 2015

(87) PCT Pub. No.: WO2014/023277
PCT Pub. Date: Feb. 13, 2014

(65) Prior Publication Data
US 2015/0246701 A1    Sep. 3, 2015

(30) Foreign Application Priority Data

Aug. 9, 2012    (DE) ................. 10 2012 214 127

(51) Int. Cl.
*B65G 41/00*    (2006.01)
*B62D 65/18*    (2006.01)
*B65G 21/20*    (2006.01)
(Continued)

(52) U.S. Cl.
CPC ............. *B62D 65/18* (2013.01); *B65G 21/00* (2013.01); *B65G 21/02* (2013.01); *B65G 21/20* (2013.01); *B65G 41/00* (2013.01); *B65G 41/006* (2013.01)

(58) Field of Classification Search
CPC ............................... B65G 41/00; B62D 65/00

USPC .......... 198/860.1, 861.1, 866, 346; 29/426.1, 29/428, 791
See application file for complete search history.

(56) References Cited

U.S. PATENT DOCUMENTS 4,437,637 A     3/1984  Buschbom
4,475,648 A    10/1984  Weeks
4,511,024 A *   4/1985  Long .................. A47B 83/001
                                                  198/346

(Continued)

FOREIGN PATENT DOCUMENTS

CN        1835863 A      9/2006
CN        1847114 A     10/2006
(Continued)

OTHER PUBLICATIONS

U.S. Appl. No. 14/420,063, Office Action Jun. 30, 2016.

*Primary Examiner* — Douglas Hess
(74) *Attorney, Agent, or Firm* — King & Schickli, PLLC

(57) ABSTRACT

The invention relates to an overhead conveying device (01) for integration in an assembly plant for transporting vehicle components, having a supporting framework (03) and at least one conveying device, wherein the supporting framework (03) has a length of more than 5 m and a width of more than 2 m and comprises longitudinally and/or transversely oriented and/or diagonal interconnected supporting beam elements (04, 05, 07), wherein the conveying device is mounted on the supporting framework (03) and can implement transport of vehicle components, wherein the supporting framework (03) has bearing means (08.5, 08.6) for bearing the overhead conveying device (01) in the assembly plant, wherein the supporting framework (03) is designed to be self-supporting and can be transported in preassembled form from the place of manufacture to the place of use.

13 Claims, 5 Drawing Sheets

Figure 1:
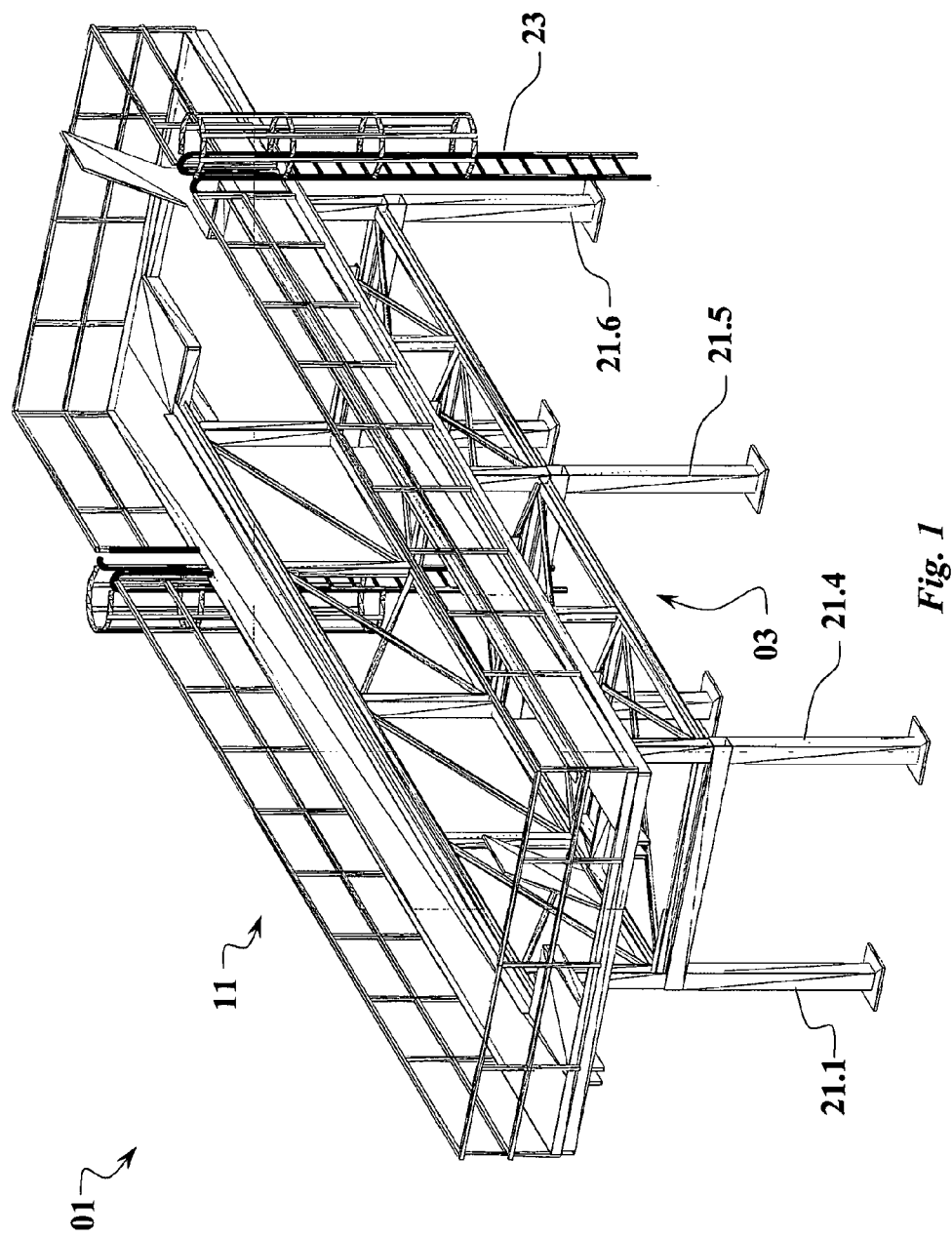

(51) Int. Cl.
 *B65G 21/02* (2006.01)
 *B65G 21/00* (2006.01)

(56) References Cited

U.S. PATENT DOCUMENTS

| | | | |
|---|---|---|---|
| 5,082,108 | A | 1/1992 | Douglas |
| 6,170,732 | B1 | 1/2001 | Vogt et al. |
| 6,372,107 | B1 | 4/2002 | Besinger |
| 7,467,996 | B1 * | 12/2008 | Jager .................. A22C 17/0093 452/177 |
| 7,498,541 | B2 | 3/2009 | Inoue et al. |
| 7,677,428 | B2 * | 3/2010 | Kilibarda ........... B23K 37/0443 228/4.1 |
| 7,789,021 | B2 | 9/2010 | Nishihara |
| 8,360,225 | B2 * | 1/2013 | Spangler .............. B65G 35/066 198/345.3 |
| 2004/0251115 | A1 | 12/2004 | Spoeler |
| 2006/0219525 | A1 | 10/2006 | Dohi |
| 2009/0279992 | A1 | 11/2009 | Spangler |
| 2011/0154654 | A1 * | 6/2011 | Cardani et al. |
| 2011/0209321 | A1 * | 9/2011 | Kilibarda et al. |
| 2011/0314665 | A1 * | 12/2011 | Kilibarda |
| 2013/0026002 | A1 * | 1/2013 | Spangler |
| 2015/0135636 | A1 * | 5/2015 | Ayres |

FOREIGN PATENT DOCUMENTS

| | | |
|---|---|---|
| CN | 2903002 Y | 5/2007 |
| CN | 102114594 A | 7/2011 |
| CN | 202296335 U | 7/2012 |
| DE | 29720801 U1 | 1/1998 |
| DE | 19739148 C1 | 10/1998 |
| DE | 10321736 B3 | 12/2004 |
| DE | 60202985 T2 | 4/2006 |
| DE | 202009006856 U1 | 8/2009 |
| DE | 202011051375 U1 | 10/2011 |
| DE | 102011008623 A1 | 7/2012 |
| EP | 0968073 A1 | 1/2000 |
| EP | 2340982 A1 | 7/2011 |
| JP | 2003341818 A | 12/2003 |
| JP | 2008222137 A | 9/2008 |
| JP | 2009012141 A | 1/2009 |
| WO | 2014023273 A1 | 2/2014 |

* cited by examiner ns of claim 1.
OVERHEAD CONVEYING DEVICE HAVING A SELF-SUPPORTING SUPPORTING FRAMEWORK

FIELD OF THE INVENTION

The invention relates to an overhead conveying device for integration in an assembly plant for transporting vehicle components in accordance with the preamble of claim 1.

BACKGROUND OF THE INVENTION

In assembly plants for manufacturing vehicles, a great variety of types of conveying devices and overhead conveying devices are employed. Based on the fact that assembly plants are individually adjusted to each type of vehicle to be manufactured and that the conveying devices are correspondingly configured, the overhead conveying devices under consideration are correspondingly individually designed and manufactured. Here, an overhead conveying device of the type at hand relates to those conveying devices below which at least enough free movement space remains to allow a person to freely walk below them. Usually, free headroom of 2.5 m or more is the aim so that forklift trucks or other transport vehicles are also able to cross below the overhead conveying device. Overhead conveying devices of this kind are also employed in order to obtain additional assembly space, wherein, standing on the ground, another conveying device or another kind of assembly plant is arranged underneath the overhead conveying device.

To integrate overhead conveying devices of this kind into a complete assembly plant in a building, it is common in the state of the art to put a supporting framework together from steel girders or the like for erecting the actual conveying device on-site in the building, wherein the struts and pillars are usually welded together. This allows for the best possible adaptation to the conditions at hand both with regard to the assembly plant and with regard to the possibilities of the building, and assembly plants or building facilities already present can in particular be taken into account.

The commonly found practice of putting the supporting framework together on site on the basis of the local conditions leads to structural calculations or a previous detailed construction of the supporting framework of the overhead conveying device usually not being carried out. Due to said calculations of the supporting framework not being carried out, said supporting framework, for safety reasons, is usually designed with a significant oversize (however, without having a guarantee that sufficient safety is given).

However, the design of an overhead conveying device known from the state of the art is particularly disadvantageous in the light of the high amount of time that is required for setting up the corresponding overhead conveying device in the assembly plant. During such setup works, the assembly plant is inevitably unavailable for other purposes in the area of the overhead conveying device to be constructed. In particular when making structural alterations to the assembly plant, switching from one design, for example for manufacturing a particular vehicle model, to a new design of the assembly plant for manufacturing a changed vehicle model, this leads to undesired production downtimes while the overhead conveying device is set up.

SUMMARY OF THE INVENTION

Therefore, it is the object of the invention at hand to accelerate the procedure of setting up of an overhead conveying device in an assembly plant as compared to previously known techniques.

Said object is attained by an inventive embodiment according to claim 1.

Advantageous embodiments are the subject-matter of the dependent claims.

For a start, the generic overhead conveying device is intended for integration in an assembly plant for transporting vehicle components. The type of the vehicle components is irrelevant in this case. The substantial feature is that the overhead conveying device is integrated in a complete assembly concept, making it possible here to manufacture a vehicle by transporting the assigned vehicle parts. For this purpose, the overhead conveying device has a supporting framework and at least one conveying device.

In accordance with the generic nature of the invention, the supporting framework has a length of more than 5 m and a width of more than 2 m. The height at which the supporting framework of the overhead conveying device is arranged above the ground of the designated building is irrelevant for the invention at hand, but the free headroom below the supporting frame has to be at least 2 m so as to guarantee a suitable useful height below the supporting framework. The supporting framework itself is realized by longitudinally and/or transversely oriented and/or diagonally interconnected supporting beam elements. Said supporting beam elements are usually designed in the shape of rods and can have tubular profiles, T-girder or other shapes and they can be designed as traction girders, pressure girders or as girders under a bending moment.

The associated conveying device is mounted on the supporting framework and allows transporting corresponding vehicle components, the transport usually taking place along the longitudinal direction of the overhead conveying device.

Furthermore, the supporting framework comprises bearing means on which the overhead conveying device is borne in the assembly plant. It is initially irrelevant whether said bearing means are fixed bearings, mobile bearings or other types of bearings. The supporting framework is at least substantially supported on the bearing means in the direction of gravity and on counter bearings being provided by the assembly plant or by the building.

In accordance with the invention, the integration of the overhead conveying device in an assembly plant is achieved with little idle times as a result of erecting the overhead conveying device by a self-supporting design of the supporting framework and by preassembly of the supporting framework. The supporting framework can be transported in preassembled form from the place of manufacture to the place of use.

However, it is particularly advantageous if both the supporting framework and the conveying device are preassembled on the supporting framework before being erected at the place of use. Here, the supporting framework, along with the conveying device that is arranged thereon, can be transported in preassembled form from the place of manufacture to the place of use.

It is obvious that, for integrating the conveying device in the assembly plant, it is necessary to connect several interface connections, whether they are power connections, data connections or process lines, such as pressurized air or hydraulic oil, between the preassembled overhead conveying device and the rest of the assembly plant.

It is at least required in accordance with the invention that the actual supporting framework is already preassembled and, furthermore, that the conveying device is advantageously mounted on the supporting framework prior to erection at the place of use. Thus, all that is needed for realizing the overhead conveying device in the assembly plant is clearing corresponding space and creating corresponding counter bearings for receiving the bearing means, wherein the preassembled overhead conveying device then has to be erected only by means of a crane. Hereby, the assembly time for erecting the overhead conveying device is drastically reduced in comparison to all known devices. Even though this is associated with a slight disadvantage with regard to flexible adaptation to the local realities, the advantages with regard to little idling of the assembly plant prevail.

It is particularly advantageous if the supporting framework is designed in the manner of a spatial truss. This means that the self-supporting supporting framework is formed by longitudinally oriented, transversely oriented, diagonal and upright interconnected supporting beam elements. This truss structure can ensure high stiffness of the supporting framework while weight is low, which in particular facilitates the transport of the preassembled overhead conveying device.

Furthermore, it is particularly advantageous if the supporting framework is formed by a welded structure. This means that the self-supporting supporting framework is substantially formed by steel struts and, if need be, by other steel elements, such as gusset plates, which are welded together. If the conveying device is light or if saving weight is generally very important, it is also conceivable to manufacture the supporting framework from aluminum, for example, and to similarly weld together the individual elements, such as struts and gusset plates.

As compared to a screwed design, a welded structure has, among other things, the advantage that there is no risk that an inadmissible change to the supporting framework can later be made by the plant operator. In designs from the state of the art, this might not be critical because of the oversize that is usually present. In a specific configuration of the supporting framework to fit the conveying device to be supported, a manipulation of the supporting framework can cause extensive damage, which is counteracted by a welded structure.

Furthermore, it is particularly advantageous if a maintenance walkway is present along at least one longitudinal side of the conveying device. Said maintenance walkway is to be designed in such a manner that it is accessible on foot without any risk. To this end, the maintenance walkway is arranged at a longitudinal side of the supporting framework and is connected thereto. The maintenance walkway and the supporting framework can be connected during preassembly of the overhead conveying device, while it is also conceivable to fix the maintenance walkway to the supporting framework on site as a per se preassembled attachment part.

It is particularly advantageous if maintenance walkways are present on both sides of the conveying device. To increase the stiffness of the entire arrangement and in particular the stability of the maintenance walkways, the maintenance walkways present on both sides along the conveying device are connected to each other via connecting girders.

In case maintenance walkways are present on both sides and the conveying device is disposed in-between, the maintenance walkways being connected at their ends via connecting girders, it is furthermore particularly advantageous if at least one vertical transport opening is provided. The latter is to be arranged between the supporting framework, the maintenance walkways and the connecting girders. The vehicle components can then be transported from the conveying device, which is located above the supporting framework, in a largely vertical direction from above the supporting framework to a location below the supporting framework through said vertical transport opening. Thus, vehicle components transported above the supporting framework can be transferred to another conveying device or to an assembly device below the overhead conveying device.

In this context, it is correspondingly particularly advantageous if corresponding vertical transport openings are provided at both ends of the conveying device so that vehicle components can be transferred from below the overhead conveying device at one end of the overhead conveying device. Then, the vehicle component can be transported along the overhead conveying device by the conveying device located thereon and can subsequently be transferred again from above the supporting framework down to below the supporting framework through the other vertical transport opening at the other end of the overhead conveying device.

If maintenance walkways are present at both sides having the vertical transport opening disposed between them at the end of the supporting framework, it is furthermore particularly advantageous if a closing means is present that can be adjusted between an open position and a closed position. The closing means is to be designed such that it is accessible on foot and that in the open position it releases the required vertical transport opening for use of the overhead conveying device and that in a closed position it allows passage, advantageously without steps, between the two maintenance walkways. Thus, in case of maintenance usually being carried out at a standstill of the conveying device, the latter can be accessed substantially circumferentially on foot by way of the maintenance walkways and of the connecting closing means.

Since the overhead conveying device is preassembled and the stiffness of the supporting framework is suitably configured to fit the weight of the overhead conveying device and its weight distribution, it is possible in a particularly advantageous fashion to allow a variable changeable erection of the supporting framework in the assembly plant. In this way, in particular the disadvantage is compensated that, unlike in the state of the art, an adaptation to the realities encountered on site is impossible, but that instead there has to be a suitable possibility of erecting the overhead conveying device in the assembly plant in its completely preassembled state with defined positions of the bearing means.

Here, it is particularly advantageous if the number $N_L$ of bearing means is higher than the number $N_E$ being required for bearing. This means that a number $N_L$ of bearing means on each of which erection in the assembly plant can take place is present at the supporting framework, while it is actually unnecessary for erection of the overhead conveying device in the assembly plant that each of these present bearing means is used. Instead, it is sufficient if only the required number $N_E$ of counter bearings is present. In this context, it is furthermore envisaged that those bearing means to be used among the available bearing means when erecting the overhead conveying device in the assembly plant can be selected arbitrarily in the required number $N_E$. This obviously means that the overhead conveying device can still be borne at all available bearing means in the assembly plant on counter bearings.

A design that has at least six bearing means is particularly advantageous, the required number $N_E$ being smaller than/equal to the number $N_L$ of present bearing means multiplied by 0.72 and rounded up. This means that in case of six available bearing means, erection is to take place on at least five counter bearings. In case of seven or eight available bearing means, erection is to take place by means of at least six of the available bearing means. In case of nine available bearing means, seven bearing means are accordingly to be used, and so on. It is particularly advantageous if the stiffness of the supporting framework is selected such that in particular the number $N_L$ of the available bearing means multiplied by 0.6 and rounded up is necessary as the required number $N_E$.

Furthermore, it is advantageous if the overhead conveying device has support elements on each of which a bearing means is arranged. In this regard, an advantageous design requires a number of support elements that corresponds to the required number $N_E$ of bearing means, while in an advantageous design a support element is still associated with each bearing means. The support elements can be free-standing support pillars and/or wall brackets and/or freely suspended traction elements. It is at least provided that the overhead conveying device rests with the supporting framework at the bearing means on counter bearings of the support elements, which in turn are connected within the assembly plant or the building.

Here, it is particularly advantageous if the number of support elements is higher than the number $N_E$ being required for bearing, wherein any one of the present support elements can be removed and/or replaced at the place of use without limiting the usability of the overhead conveying device. Thus, a support pillar can be removed in particular in case of damage if a transport vehicle collides with a support pillar, for example, without limiting the functionality of the overhead conveying device either with respect to the transport of vehicle components by way of the conveying device or with respect to ensured sufficient statics. In case of damage, an uncomplicated replacement can thus take place without assembly having to stand still.

In the following figures, an exemplary overhead conveying device is outlined in a roughly sketched way, having a supporting framework standing on support pillars and a circumferential maintenance walkway, wherein the illustration of the conveying device belonging to the overhead conveying device has been omitted.

BRIEF DESCRIPTION OF THE DRAWING FIGURES

Figure 2:
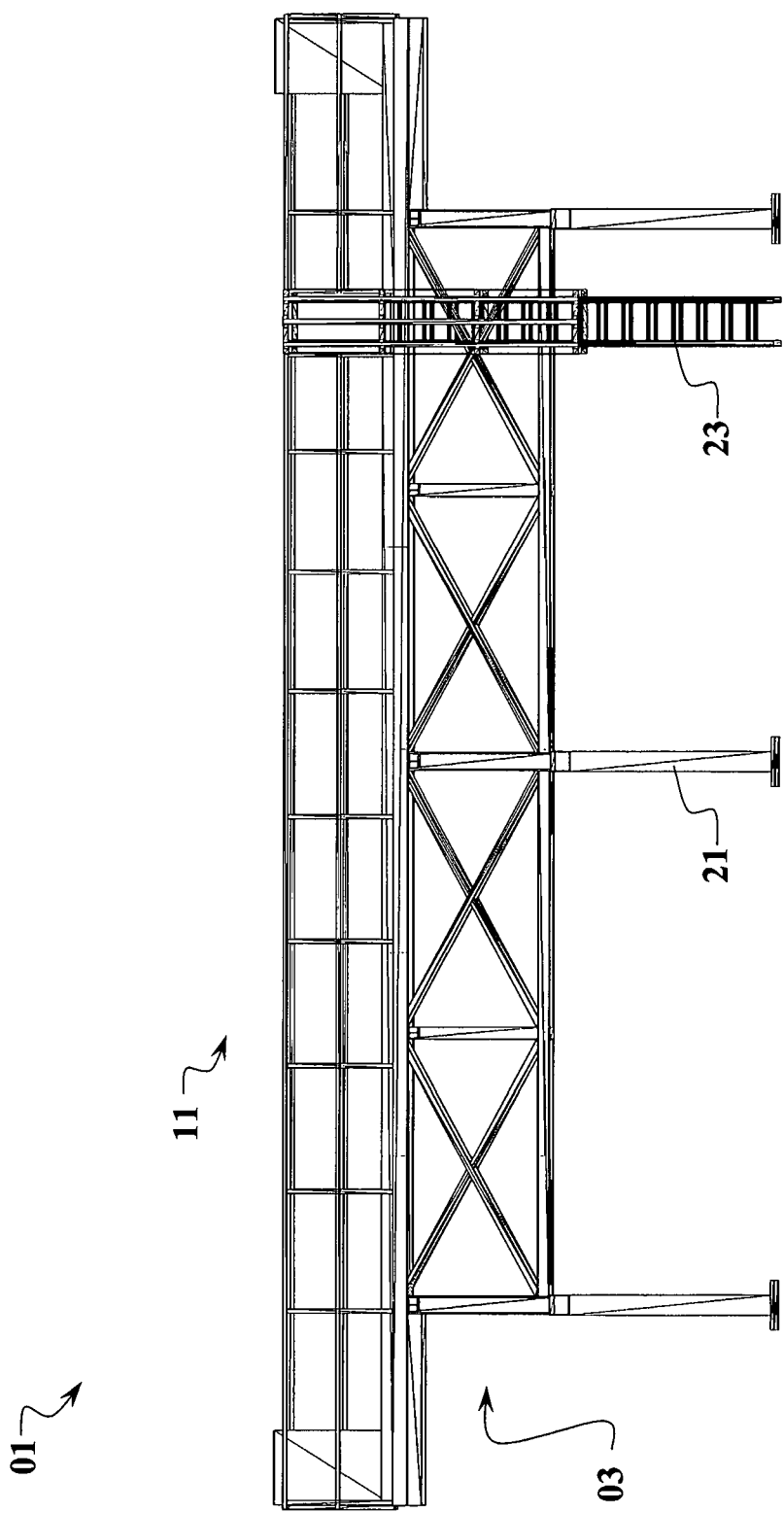
Figure 3:
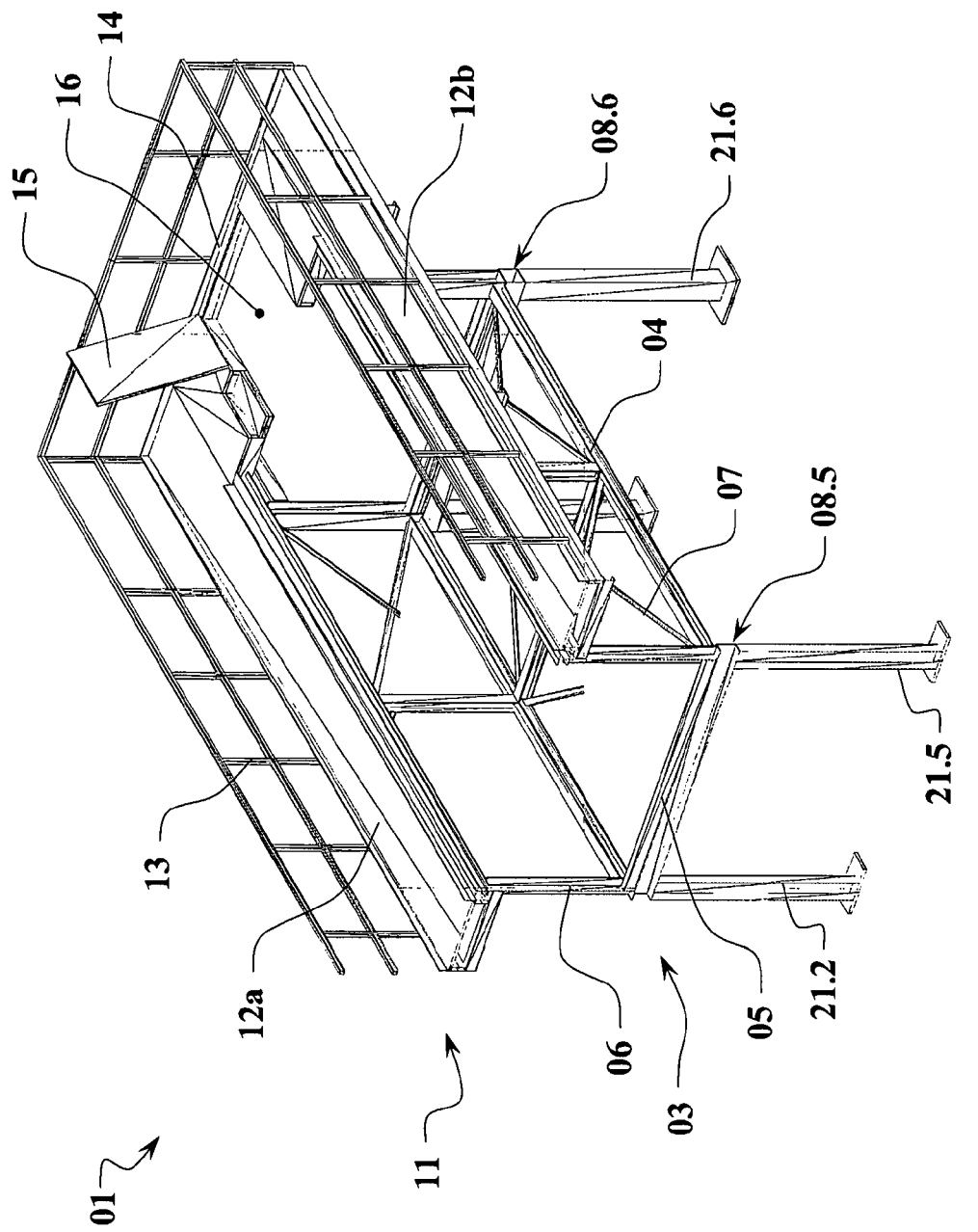
Figure 4:
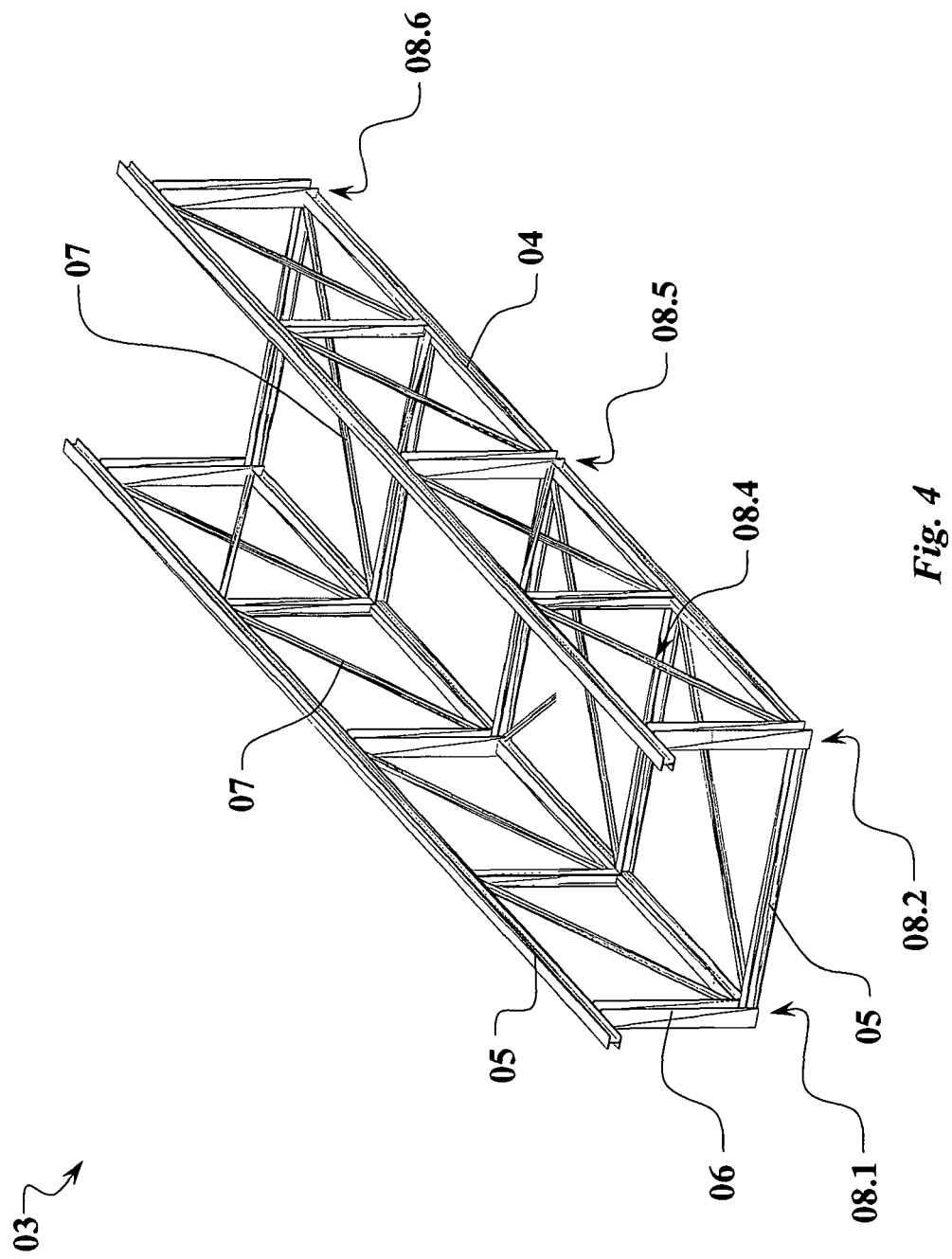
Figure 5:
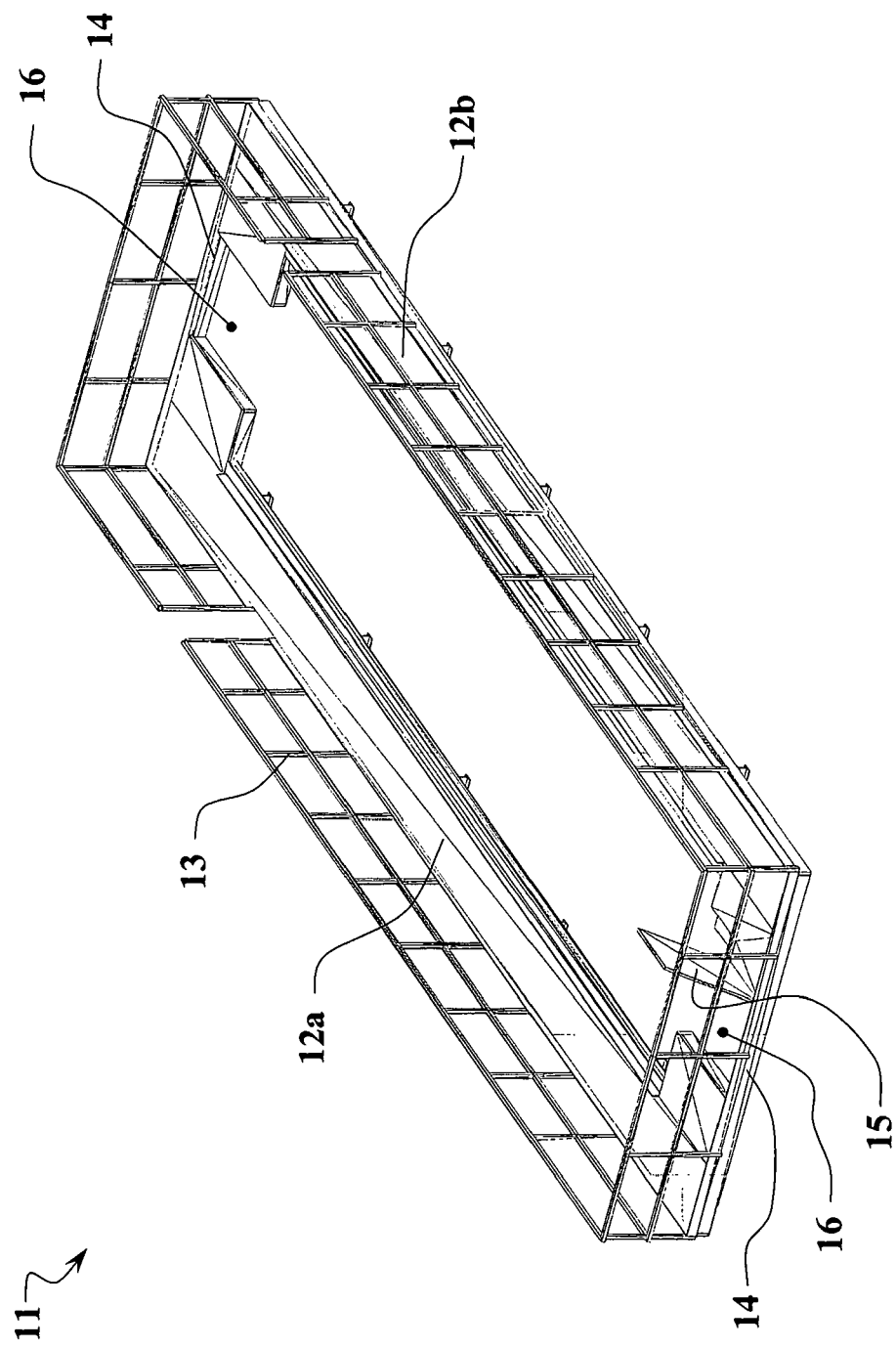

In the figures:
FIG. 1 shows an exemplary overhead conveying device in a perspective view leaving out the conveying device;
FIG. 2 shows a lateral view of FIG. 1;
FIG. 3 shows a half-section of the view of FIG. 1;
FIG. 4 shows the supporting framework of FIG. 1;
FIG. 5 shows the maintenance walkway of FIG. 1.

DETAILED DESCRIPTION OF THE INVENTION

In FIG. 1, a perspective illustration of an overhead conveying device 01 is outlined in an exemplary embodiment. However, illustration of the conveying device belonging to the overhead conveying device 01 has been omitted. As the person skilled in the art can easily appreciate, the conveying device is located centrally in the supporting framework 03 and depending on the embodiment it projects beyond the supporting framework 03. Herein, the supporting framework 03 is designed in the manner of a truss and comprises a plurality of supporting beam elements 04-07 that are welded together. As can be taken from FIG. 3 in this regard, the supporting framework 03 is formed by longitudinally oriented supporting beam elements 04, transversely oriented supporting beam elements 05, upright supporting beam elements 06 and diagonal supporting beam elements 07. The supporting framework 03 with its supporting beam elements 04, 05, 06 and 07 is designed such that there is a sufficient self-supporting inherent stiffness when the conveying device is mounted thereon so that a transport of the entire overhead conveying device 01 or at least of the supporting framework 03 having the conveying device mounted thereon in its entirety is possible. For this purpose, it is imperative that the supporting framework 03, in view of stiffness, in particular bending stiffness, is to be configured to the effect that bearing on the associated bearing means 08 is possible in a substantially deformation-free manner both in case of transport and for later erection.

In correspondence to the static configuration of the overhead conveying device 01, which has to be ascertained in each case, the supporting framework 03, on its underside, has a plurality of bearing means 08.1 to 08.6, on which the overhead conveying device is mounted on support pillars 21.1 to 21.6. Furthermore, in this embodiment example, the statics of the supporting framework 03 are configured and the stiffness is selected in such a manner that the stability of the entire arrangement is ensured even if one support pillar 21.1 to 21.6 is omitted. Thus, it is conceivable on the one hand to use only five of the illustrated six support pillars 21 in case of erection in the assembly plant, and on the other hand it is also possible to use six support pillars, in which case a support pillar can be replaced in case of damage resulting from a collision with a vehicle, for example, without limiting the functionality of the overhead conveying device.

Furthermore, the maintenance scaffold 11 belonging to the overhead conveying device 01 is visible, having maintenance walkways 12a and 12b, see also FIG. 5, which extend at both sides of the overhead conveying device. At their ends, said maintenance walkways 12 are connected to connecting girders 14, providing increased stability of the entire arrangement together with the maintenance scaffold 11 and of the maintenance walkways 12a, 12b. A surrounding safety railing 13 ensures the safety of maintenance personnel when accessing the maintenance walkway 12. Access to the maintenance walkway 12 is provided by ladders 23 arranged on the maintenance scaffold 11.

Furthermore, the two vertical transport openings 16 present at the end sides are visible, through which the vehicle component to be transported can be passed. To permit risk-free passage from one maintenance walkway 12a to the other maintenance walkway 12b, closing means 15 are further present at the vertical transport openings 16. Said closing means 15 can be brought from an outlined open position into a closed position, thus providing a level passage from one side to the other side.

The invention claimed is:

1. An overhead conveying device (01) for integration in an assembly plant for transporting vehicle components, having a supporting framework (03) and at least one conveying device, wherein the supporting framework (03) has a length of more than 5 m and a width of more than 2 m and comprises longitudinally and/or transversely oriented and/or diagonal interconnected supporting beam elements (04, 05, 07), wherein the conveying device is mounted on the supporting framework (03) and can implement transport of vehicle components, wherein the supporting framework (03) has bearing means (08) for bearing the overhead conveying device (01) in the assembly plant, characterized in that the supporting framework (03) is designed to be self-supporting and can be transported in preassembled form from the place of manufacture to the place of use, and in that the number $N_L$ of bearing means (08) is higher than the number $N_E$ being required for bearing, wherein the overhead conveying device (01) can be borne at bearing means (08) selected arbitrarily in the required number $N_E$.

2. The overhead conveying device (01) according to claim 1, characterized in that the conveying device, disregarding interface connections, is preassembled on the supporting framework (03) in an operative condition.

3. The overhead conveying device (01) according to claim 1, characterized in that the supporting framework (03) is designed in the manner of a spatial truss, which comprises longitudinally and transversely oriented and diagonal and upright interconnected supporting beam elements (04, 05, 06, 07).

4. The overhead conveying device (01) according to claim 3, characterized in that the supporting framework (03) is formed by a welded structure.

5. The overhead conveying device (01) according to claim 1, characterized by a maintenance walkway (12a, 12b) along at least one longitudinal side of the conveying device, in particular along both longitudinal sides, the maintenance walkway being arranged at the supporting framework (03) and being accessible on foot substantially without any risk.

6. The overhead conveying device (01) according to claim 5, characterized in that maintenance walkways (12a, 12b), which are present on both sides of the conveying device, are connected to each other at both ends of the overhead conveying device (01) via connecting girders (14).

7. The overhead conveying device (01) according to claim 6, characterized by at least one vertical transport opening (16) between the supporting framework (03) and maintenance walkways (12a, 12b) being present on both sides as well as the connecting girders (14), through which transport opening vehicle components can be transported from the conveying device above the supporting framework (03) to a location below the supporting framework (03).

8. The overhead conveying device (01) according to claim 7, characterized in that the maintenance walkways (12a, 12b) being present on both sides, in the region of the vertical transport opening (16), can be connected to each other with a closing means (15) being adjustable between an open position and a closed position so as to be accessible on foot.

9. The overhead conveying device (01) according to claim 1, characterized by at least six bearing means (08), wherein the required number $N_E$ is smaller than/equal to the number $N_L$ of present bearing means (08) multiplied by 0.72 and rounded up, in particular multiplied by 0.6.

10. The overhead conveying device (01) according to claim 1, characterized by support elements as free-standing support pillars (21) and/or wall brackets and/or freely suspended traction elements, at each of which one bearing means (08) is arranged.

11. The overhead conveying device (01) according to claim 10, characterized in that the number $N_S$ of support elements (21) is higher than the number $N_E$ being required for bearing, wherein any one of the present support elements (21), for example in case of damage, can be removed and/or replaced without limiting the usability of the overhead conveying device (01).

12. An overhead conveying device (01) for integration in an assembly plant for transporting vehicle components, having a supporting framework (03) and at least one conveying device, wherein the supporting framework (03) has a length of more than 5 m and a width of more than 2 m and comprises longitudinally and/or transversely oriented and/or diagonal interconnected supporting beam elements (04, 05, 07), wherein the conveying device is mounted on the supporting framework (03) and can implement transport of vehicle components, wherein the supporting framework (03) has bearings (08) for bearing the overhead conveying device (01) in the assembly plant, characterized in that the supporting framework (03) is designed to be self-supporting and can be transported in preassembled form from the place of manufacture to the place of use, and in that the number $N_L$ of bearings (08) is higher than the number $N_E$ being required for bearing, wherein the overhead conveying device (01) can be borne at bearings (08) being selected arbitrarily in the required number $N_E$.

13. An overhead conveying device (01) for integration in an assembly plant for transporting vehicle components, having a supporting framework (03) and at least one conveying device, wherein the supporting framework (03) has a length of more than 5 m and a width of more than 2 m and comprises longitudinally and/or transversely oriented and/or diagonal interconnected supporting beam elements (04, 05, 07), wherein the conveying device is mounted on the supporting framework (03) and can implement transport of vehicle components, wherein the supporting framework (03) has bearing means (08) for bearing the overhead conveying device (01) in the assembly plant, characterized in that the supporting framework (03) is designed to be self-supporting and can be transported in preassembled form from the place of manufacture to the place of use; and a maintenance walkway (12a, 12b) along both longitudinal sides of the conveying device, the maintenance walkways being arranged at the supporting framework (03) and being accessible on foot substantially without any risk, the maintenance walkways being connected to each other at both ends of the overhead conveying device (01) via connecting girders (14), at least one vertical transport opening (16) between the supporting framework (03) and maintenance walkways (12a, 12b) being present on both sides as well as the connecting girders (14), through which transport opening vehicle components can be transported from the conveying device above the supporting framework (03) to a location below the supporting framework (03), the maintenance walkways (12a, 12b) being connected to each other with a closing means (15) adjustable between an open position and a closed position so as to be accessible on foot.

* * * * *